Aug. 26, 1969
C. L. MEEHAN
3,463,522
CEILING FASTENER
Filed Feb. 26, 1968
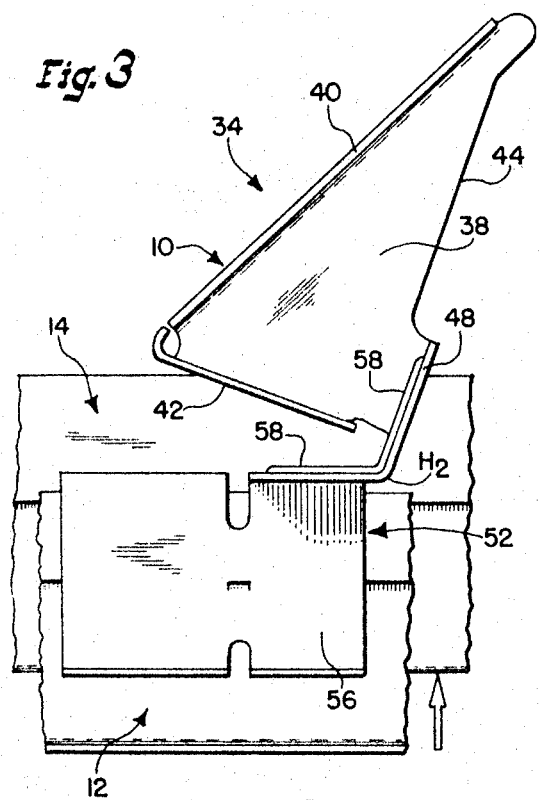
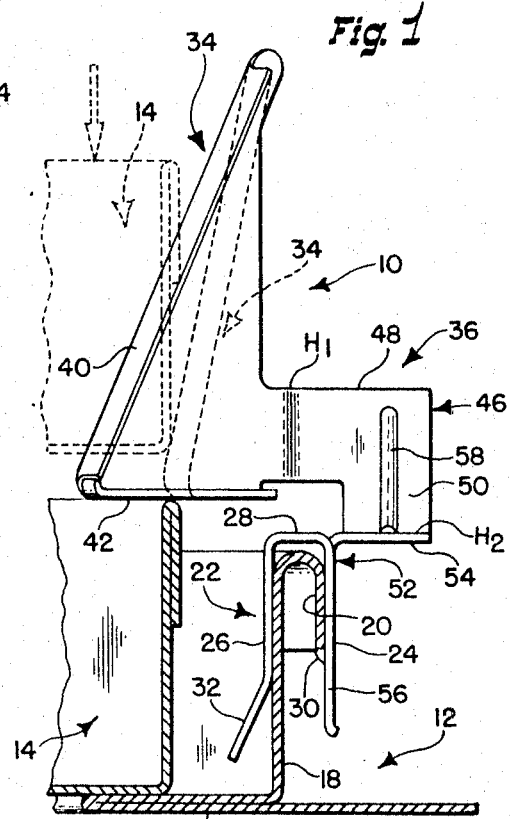
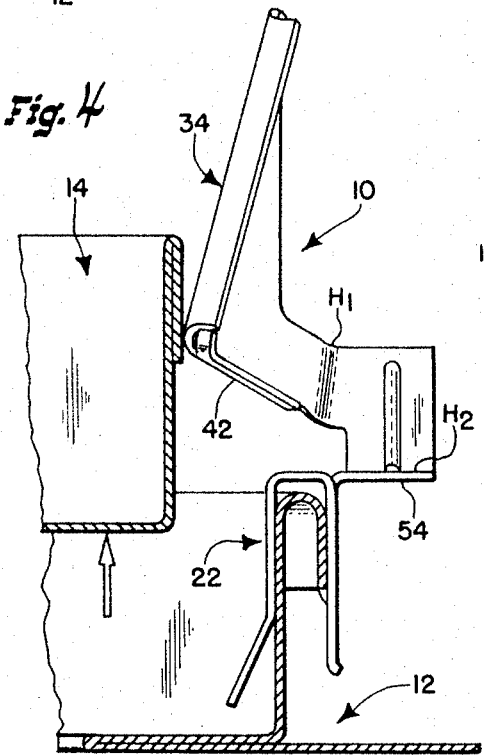
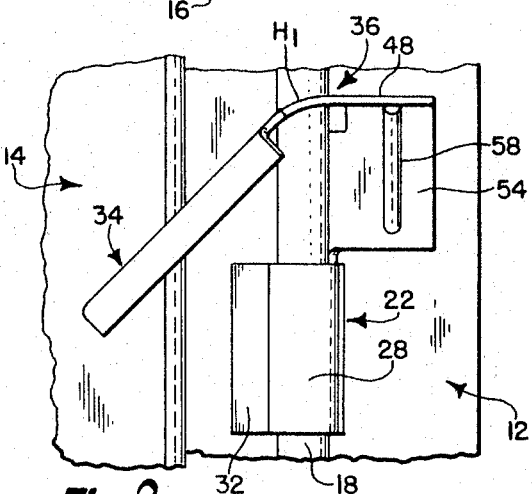
INVENTOR.
Clarence L. Meehan
BY
His Att'ys United States Patent Office
3,463,522
Patented Aug. 26, 1969

1

3,463,522
CEILING FASTENER
Clarence L. Meehan, Itasca, Ill., assignor to Illinois Tool Works Inc., Chicago, Ill., a corporation of Delaware
Filed Feb. 26, 1968, Ser. No. 708,004
Int. Cl. E04b 5/52; E04c 2/00
U.S. Cl. 287—189.35
6 Claims

ABSTRACT OF THE DISCLOSURE

A fastener device for modular ceiling arrangements in which a frame element provides underlying support for a ceiling panel or the like, and the fastener device includes retension means for releasably holding the ceiling panel or the like to the frame element.

---

Modular ceiling arrangements for steel, fireproof buildings and the like, include a supporting or frame structure arranged in a checkerboard pattern which supports light coffers, flat pans, ceiling panels or the like. The supporting structure which is known in the trade as "runners" are attached to the crossbeams which carry the load of the ceiling. Each of the "runners" underlie and support the light coffers, flat pans or ceiling panels as may be desired, and fastener devices are used for holding the light coffers, flat pans or ceiling panels in place relative to the "runners."

In addition to holding the light coffers, flat pans, ceiling panels or the like in place, the fastener devices must be releasable when a given upward force is applied to the light coffers, flat pans, ceiling panels or the like. The fastener device of the present invention meets both of these requirements as will become apparent from the discussion that is to follow.

It is an object of the present invention to provide a fastener device for modular ceiling arrangements which releasably, but securely retain a light coffer, flat pan, ceiling panel or the like in place relative to a supporting structure or frame element.

Another object of the present invention is to provide a fastener device of the aforementioned type which is capable of releasably disengaging itself from a light coffer, flat pan, ceiling panel or the like when a given amount of upward force is applied thereto. Other objects which are achieved by the present invention include, among others the following:

Economical manufacture of the fastener device by known manufacturing techniques; ease of assembly and disassembly of the fastener device to the modular ceiling arrangement; long life, durable one-piece component; and various other objects flowing from the functioning and operation of the present invention.

These and other objects and advantages of the present invention are attained by the provision of a fastener device for modular ceiling arrangements in which a frame element provides underlying support for a ceiling panel or the like, the fastener device being mounted to the frame element and including retention means for holding the ceiling panel or the like to the frame element, the retention means comprising a flexible wing which initially overlies the ceiling panel or the like and is capable of flexing both upwardly and laterally away from the ceiling panel when a given upward force is applied thereto to permit disassembly of the ceiling panel or the like from the frame element.

Reference is now made to the drawing wherein:

FIG. 1 is an enlarged fragmentary end elevational view, partly in section, of a fastener device assembled to a

2 modular ceiling arrangement, and also showing the manner in which the fastener device yields to accept a ceiling panel or the like;

FIG. 2 is a fragmentary top plan view depicting the fastener device assembled to the components of the modular ceiling arrangement;

FIG. 3 is a fragmentary side elevational view illustrating the initial disassembly movement of the fastener device relative to one of the components of the modular ceiling arrangement; and FIG. 4 is a fragmentary end elevational view, partly in section, showing the final disassembly movement of the fastener device relative to one of the components of the modular ceiling arrangement.

The fastener device 10 illustrated in the drawing is mounted to and retains various elements of a modular ceiling arrangement which includes a plurality of supporting structures or frame elements 12 which are mounted to crossbeams which carry the ceiling, the supporting structure or frame elements 12 in turn underlying and supporting light coffers, flat pans, ceiling panels or the like. In the drawing, the frame element 12 supports a flat pan 14 by way of a double thickness supporting shelf 16. Each of the flat pans 14 are supported by the frame elements 12 at least on opposite sides thereof, the flat pan 14 being tilted for movement through the opening between generally opposed supporting shelves 16 of the frame elements 12.

Each of the frame elements 12 further include an upwardly directed flange 18 which has a reversely curving portion 20 extending downwardly and away from the uppermost extremity of the flange 18. The flange 18 with its reversely curving portion 20 is designed to receive a portion of the fastening device 10 for mounting the fastening device 10 relative to the frame element 12. While various types of fastening structure may be utilized to mount the fastener device 10 relative to the frame element 12, it has been found that the U-shaped clip portion 22 of the fastener device 10 functions well from both the assembly and mounting standpoint. The U-shaped clip portion 22 includes a pair of depending legs 24, 26 which are interconnected to one another across the bight end portion 28 thereof. The U-shaped clip portion 22 of the fastener device 10 is adapted to be received over the upper portion of the flange 18 and its reversely curving end portion 20 preferably in frictional engagement therewith. It will be noted that the leg 24 includes a tab element 30 which is adapted to engage the outer free extremity of the reversely curving portion 20 of the flange 18 to retain and mount the fastener device 10 relative to the frame element. It will also be noted that the depending leg 26 includes an angularly offset foot portion 32 which extends from the lowermost extremity of the depending leg 26. The foot portion 32 acts to center the flat pan 14 relative to the frame element 12.

The fastener device 10 includes, as an important feature of the present invention, a spring wing 34 which functions to releasably secure the flat pan 14 relative to the frame element 12. The spring wing 34 is integrally connected to the U-shaped clip portion 22 across an interconnecting web structure 36, and thus the fastener device 10 is illustrated as preferably comprising a one-piece device. For the functioning of the various elements of the fastener device, it is also desirable that the fastener device be made from a resilient sheet material such as spring steel, and this will be made apparent from the discussion that is to follow.

The spring wing 34 preferably is triangularly-shaped after the fashion of a right triangle which includes a flat surface 38 connecting the hypotenuse side 40 with the short and long sides 42, 44 respectively. As best seen in FIGS. 1–2 the triangularly-shaped spring wing 34 is inwardly and angularly offset relative to the flange 18 of the frame element 12 to position the short side 42 in an overhanging ledge position relative to the flat pan 14. When the spring wing 34 thus overlies the flat pan 14, it retains the flat pan in position relative to the frame element 12. If desired, the spring wing 34 is capable of exerting a limited amount of force against the uppermost portion of the surrounding side wall of the flat pan 14.

The flat pan 14 is assembled to the fastener device 10 by first moving the flat pan 14 against the surface 38 of the spring wing 34 as shown by the dotted line representation in FIG. 1 of the drawing. As the spring wing 34 is hingedly connected to the web structure 36 as will be described below, it is capable of flexing from the full line position to beyond the dotted line representation shown in FIG. 1 to enable the flat pan 14 to slide by and drop in position on the shelf portion 16 of the frame element 12. Once the flat pan 14 is in position as shown by the full line representation in FIG. 1 of the drawing, the spring wing 34 moves to its full line position as illustrated where it overlies and retains the flat pan 14 relative to the frame element 12.

The interconnecting web structure 36 is important in permitting the disassembly of the flat pan 14 from the fastener device 10. In this connection, it will be noted that the interconnected web structure includes an upper L-shaped section 46 having a horizontally extending portion 48 which curves slightly as it approaches its interconnection with the long side 44 of the spring wing 34, and a vertically directed portion 50. The interconnected web structure 36 further includes a lower L-shaped section 52 including a horizontal portion 54 which is integrally connected to the vertically extending portion 50 of the upper L-shaped leg 46, and a vertically extending portion 56 which extends downwardly from and is interconnected to the U-shaped clip portion 22 as best seen in FIG. 3 of the drawing. A strengthening rib 58 is formed in the legs 50 and 54 of the upper and lower L-shaped sections 46, 52 respectively to rigidify the same in view of the small width thereof.

There is provided, as the result of the interconnected web structure incorporating the L-shaped sections 46, 52, a vertical and horizontal hinge connection for the spring wing 34 which aids in the assembly and disassembly of the flat pan 14 or its equivalent from the frame element 12. Specifically, a vertical hinge connection H1 as seen in FIGS. 1–2 is created as the result of the curvilinear area of the upper portion 48 adjacent to its juncture with the spring wing 34. The spring wing 34 will thus be able to move or hinge about the integral hinge connection H1 during the assembly and disassembly of the flat pan 14 or its equivalent relative to the fastener device 10. This is illustrated clearly in FIG. 1 of the drawing wherein the spring wing 34 moves to a dotted line position in response to the movement of the flat pan 14 from the dotted to the full line position shown.

While the vertical hinge connection H1 is useful in both assembly and disassembly operations, a horizontal hinge connection H2 as best seen in FIG. 3 is an important feature for disassembly operations. Since the spring wing 34 is disposed at an angle to the flange 18 of the frame element 12, a vertical hinge connection H1 will not, in and of itself, permit the flat pan 14 to be disassociated relative to the spring wing 34 and thus the fastener device 10. Hence, the horizontal hinge connection H2 which is located in the juncture between the portion 50 of the upper L-shaped section 46 and the portion 54 of the lower L-shaped section 52 provides the necessary flexing for the spring wing 34 during the initial disassembly movement to permit the vertical hinge connection H1 to be brought into operation to permit disassembly to take place.

Reference is now made to FIGS. 3–4 of the drawing for a description of the various movements of the spring wing 34 when a given upward force is applied by the flat pan 14 or its equivalent against the spring wing 34. The smaller side 42 of the right triangularly shaped spring wing 34 is arranged in a substantially horizontal position as shown in FIG. 1, and thus functions as an overhanging ledge which retains and holds the flat pan 14 or its equivalent relative to the frame element 12. When a given upward force is applied through the flat pan 14 or its equivalent, the flat pan 14 will first be brought into contact with the substantially horizontally extending overhanging ledge or smaller side portion 42 of the spring wing 34. Continued upward movement of the flat pan 14 will cause the spring wing 34 to hinge about the horizontal hinge connection H2, thereby disposing the smaller side 42 of the right triangularly-shaped spring wing 34 at an angle relative to the substantially horizontally extending bight end portion 28 of the U-shaped clip portion 22. The spring wing 34 continues to flex or hinge about the horizontal hinge connection H2 until a given angular disposition of the overhanging ledge portion 42 is reached whereupon the spring wing 34 will hinge or flex about the vertical hinge connection H1. When this occurs the spring wing 34 will thus be able to move laterally away from the flat pan 14 for disassembly of the flat pan relative to the fastener device 10. The FIG. 4 illustration shows the spring wing 34 after it has begun its vertical hinging movement about the vertical hinge connection H1. It will be recognized, of course, that the vertically hinging movement will take place at an earlier point in time to permit the overhanging ledge portion 42 to be initially disassociated from the flat pan 14.

From the foregoing, it will now be appreciated that the fastener device of the present invention effectively retains a light coffer, flat pan, ceiling panel or the like relative to a frame element, and at the same time permit ease of assembly and disassembly of the light coffer, flat pan, ceiling panel or the like relative to the frame element.

It is to be understood that the specific example of the invention herein shown and described is for illustrative purposes only. Various changes in structure will no doubt occur to those skilled in the art, and will be understood as forming a part of this invention insofar as they fall within the spirit of the appended claims.

What is claimed is:

1. A resilient fastener device for modulator ceiling arrangements in which a frame element provides underlying support for a ceiling panel or the like, said fastener device including a clip portion for mounting to said frame element and including retention means for holding said ceiling panel or the like to said frame element, said retention means comprising a flexible wing having a tapered entering surface and having a substantially horizontal over-hanging ledge portion which initially overlies said ceiling panel or the like, said flexible wing and said clip portion being joined together by a web structure, wherein said flexible wing and said clip portion are each resiliently hingedly connected to said web structure with the respective hinged connections lying in planes which are substantially perpendicular to each other, whereby said wing is capable of flexing both upwardly and laterally away from the ceiling panel when a given upward force is applied thereto to permit disassembly of said ceiling panel or the like from said frame element.

2. The fastener device as defined in claim 1 wherein said flexible wing is configured to apply a limited amount of force against said ceiling panel or the like when functioning as a retention means.

3. The fastener device as defined in claim 1 wherein said fastener device comprises a one-piece member made of resilient sheet material.

4. A fastener device as defined in claim 3 wherein said flexible wing is hingedly connected to said web structure at a point laterally outwardly offset from the outer most extremity of said ceiling panel or the like.

5. The fastener device as defined in claim 1 wherein the flexible wing is provided with a substantially triangular configuration.

6. The fastener device as defined claim 1 wherein said clip portion is U-shaped and includes depending legs which are mounted over a reversely curved portion of an upwardly directed flange of said frame element, said U-shaped clip having a tab extending inwardly from one of the depending legs thereof which engages beneath the free end of the reversely curved portion of said flange to prevent disassociation of the fastener device from the frame element.

References Cited

UNITED STATES PATENTS 3,248,839   5/1966   Roberts et al. _____ 52—484

FOREIGN PATENTS 1,195,403   5/1959   France.
602,489     5/1948   Great Britain.
642,473     9/1950   Great Britain.

RAMON S. BRITTS, Primary Examiner

U.S. Cl. X.R.

52—476, 484, 489; 248—228, 316